United States Patent
Nable et al.

(10) Patent No.: US 12,534,415 B2
(45) Date of Patent: Jan. 27, 2026

(54) SEAL COAT

(71) Applicant: Raytheon Technologies Corporation, Farmington, CT (US)

(72) Inventors: Jun Nable, Hamden, CT (US); Ying She, Rocky Hill, CT (US)

(73) Assignee: RTX CORPORATION, Farmington, CT (US)

( * ) Notice: Subject to any disclaimer, the term of this patent is extended or adjusted under 35 U.S.C. 154(b) by 773 days.

(21) Appl. No.: 17/888,996

(22) Filed: Aug. 16, 2022

(65) Prior Publication Data

US 2024/0059621 A1    Feb. 22, 2024

(51) Int. Cl.
C04B 41/50 (2006.01)
C04B 41/45 (2006.01)
C04B 41/87 (2006.01)
C04B 41/89 (2006.01)
F01D 25/00 (2006.01)

(52) U.S. Cl.
CPC ........ C04B 41/5061 (2013.01); C04B 41/457 (2013.01); C04B 41/87 (2013.01); C04B 41/89 (2013.01); *C04B 2235/3826* (2013.01); *C04B 2235/9607* (2013.01); *C04B 2235/9692* (2013.01); *F01D 25/005* (2013.01); *F05D 2220/32* (2013.01); *F05D 2300/6033* (2013.01)

(58) Field of Classification Search
None
See application file for complete search history.

(56) References Cited

U.S. PATENT DOCUMENTS

| 5,246,736 A * | 9/1993 | Goujard ................ C04B 35/565 427/419.7 |
| 5,965,266 A * | 10/1999 | Goujard ............ C04B 35/62884 427/419.7 |
| 8,137,826 B2 | 3/2012 | Louchet-Pouillerie et al. |
| 11,046,615 B2 | 6/2021 | Tang et al. |
| 2021/0172328 A1* | 6/2021 | Smith ..................... C23C 24/00 |
| 2021/0246080 A1* | 8/2021 | Jackson .................. F01D 5/288 |

FOREIGN PATENT DOCUMENTS

EP    3838872 A1    6/2021
EP    3862338 A1    8/2021

OTHER PUBLICATIONS

Sudre, "Critical review on oxidation protection for carbon-based composites", ONERA, 1995. pp 1-7.
European Search Report for European Patent Application No. 23191503.4 dated Jan. 25, 2024.
Greil et al. "Self-healing engineering ceramics with oxidation-induced crack repair", Advanced Engineering Materials, vol. 22, No. 9, Dec. 2019.

* cited by examiner

*Primary Examiner* — David Sample
(74) *Attorney, Agent, or Firm* — Carlson, Gaskey & Olds, P.C.

(57) ABSTRACT

A coating for an article includes a seal coat comprising self-healing particles disposed in a seal coat matrix and a bond coat disposed on the seal coat. The bond coat includes a matrix, diffusive particles disposed in the matrix, and gettering particles disposed in the matrix. A coating for an article and a method of applying a coating to an article are also disclosed.

18 Claims, 3 Drawing Sheets

SEAL COAT

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

This disclosure relates to composite articles, such as those used in gas turbine engines, and methods of coating such articles. Components, such as gas turbine engine components, may be subjected to high temperatures, corrosive and oxidative conditions, and elevated stress levels. In order to improve the thermal and/or oxidative stability, the component may include various coatings.

SUMMARY

A coating for an article according to an exemplary embodiment of this disclosure, among other possible things includes a seal coat comprising self-healing particles disposed in a seal coat matrix and a bond coat disposed on the seal coat. The bond coat includes a matrix, diffusive particles disposed in the matrix, and gettering particles disposed in the matrix.

In a further example of the foregoing, the seal coat further includes activator particles, the activator particles operable to hasten or improve viscous flow of the self-healing particles upon oxidation.

In a further example of any of the foregoing, the seal coat comprises between about 0.1 and about 10 percent by weight activator particles.

In a further example of any of the foregoing, the seal coat comprises between about 0.1 and about 5 percent by weight activator particles.

In a further example of any of the foregoing, the self-healing particles exhibit diffusive behavior at lower temperatures than the diffusive particles.

In a further example of any of the foregoing, the self-healing particles comprise at least one of silicon borocarbide, silicon boronitrocarbide, other carbides, aluminum nitride, borides, silicides, MAX phase particles, refractory metals, and combinations thereof.

In a further example of any of the foregoing, the seal coat matrix is silicon carbide.

In a further example of any of the foregoing, the seal coat is between about 20 microns to about 200 microns thick.

In a further example of any of the foregoing, the self-healing particles are encapsulated with a material that is relatively more inert with respect to oxidants than the material of the self-healing particles.

In a further example of any of the foregoing, the coating is operable to be disposed on a ceramic matrix composite substrate.

In a further example of any of the foregoing, at least some of the seal coat constituents are infiltrated into the ceramic matrix composite.

A coating for an article according to an exemplary embodiment of this disclosure, among other possible things includes a seal coat. The seal coat includes a first layer of seal coat matrix material disposed on the bond coat, a layer of self-healing material disposed on the first layer of seal coat matrix material, and a second layer of seal coat matrix material disposed on the layer of self-healing material. The coating also includes a bond coat disposed on the seal coat. The bond coat includes a matrix, diffusive particles disposed in the matrix and gettering particles disposed in the matrix.

In a further example of the foregoing, the self-healing material comprises at least one of silicon borocarbide, silicon boronitrocarbide, other carbides, aluminum nitride, borides, silicides, MAX phase particles, refractory metals, and combinations thereof.

In a further example of any of the foregoing, the seal coat matrix is silicon carbide.

In a further example of any of the foregoing, the coating is operable to be disposed on a ceramic matrix composite substrate.

In a further example of any of the foregoing, at least some of the seal coat constituents are infiltrated into the ceramic matrix composite.

A method of applying a coating to an article according to an exemplary embodiment of this disclosure, among other possible things includes applying a bond coat over a seal coat disposed on an article. The bond coat includes a matrix, diffusive particles disposed in the matrix, and gettering particles disposed in the matrix. The seal coat includes a matrix material and a self-healing material.

In a further example of the foregoing, the seal coat is applied by preparing a slurry comprising a carrier fluid, seal coat matrix material, and self-healing particles; applying the slurry to the bond coat; and curing the slurry to form the seal coat.

In a further example of any of the foregoing, the slurry further comprises activator particles, the activator particles operable to hasten or improve viscous flow of the self-healing particles upon oxidation.

In a further example of any of the foregoing, the seal coat is applied by applying at least one layer of seal coat matrix material on the bond coat by one of chemical vapor deposition and chemical vapor infiltration; and applying at least one layer of self-healing material by one of chemical vapor deposition and chemical vapor infiltration.

DETAILED DESCRIPTION

Figure 1:
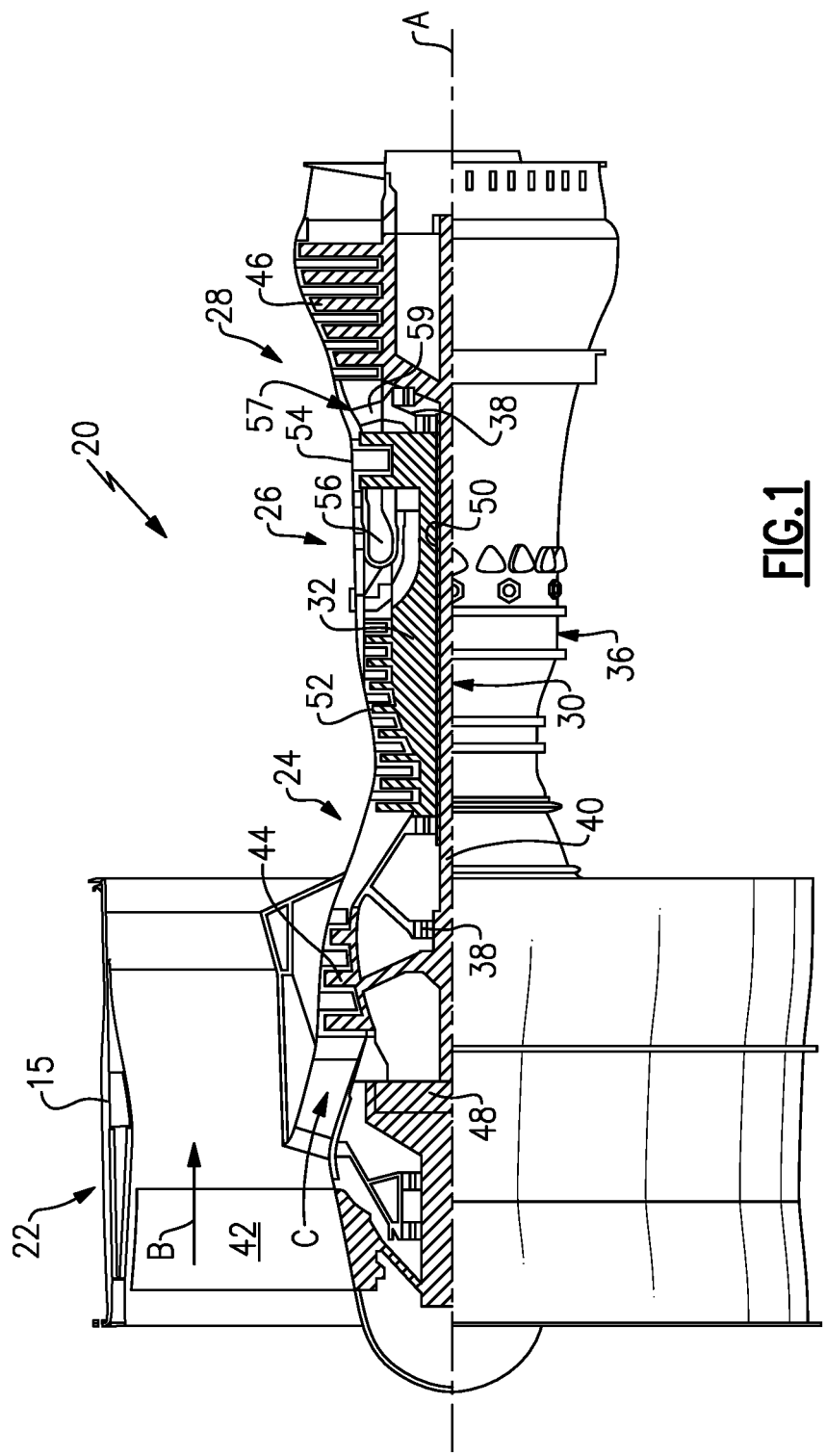
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
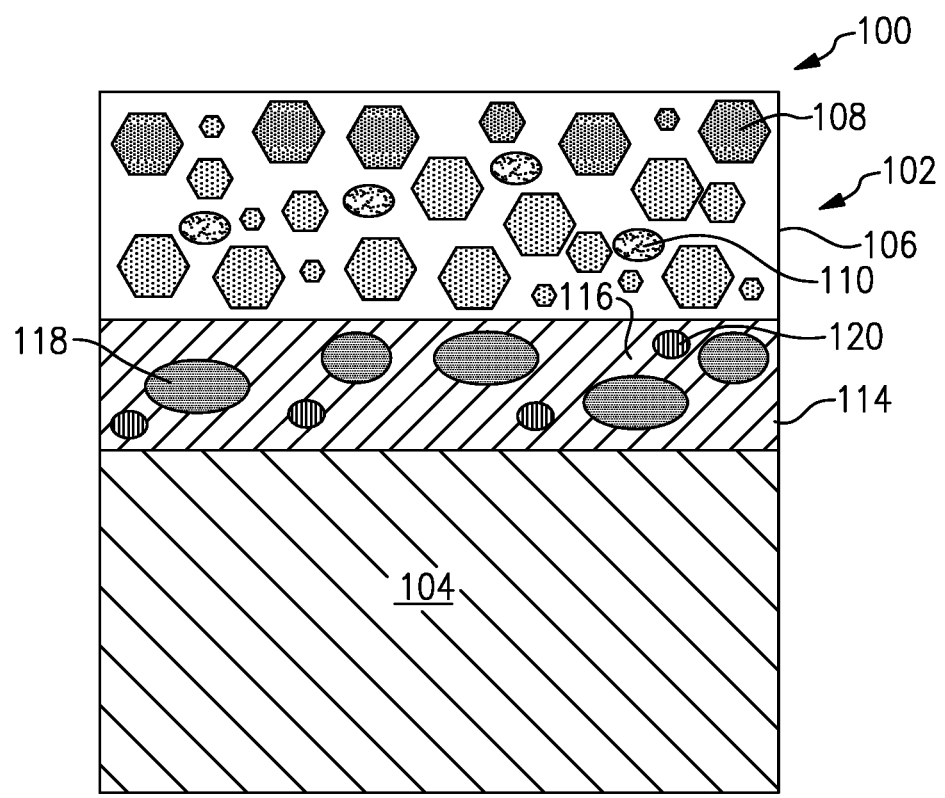
FIG. 2 illustrates an article for the gas turbine engine of FIG. 1 with a coating.

FIG. 2 schematically illustrates a representative portion of an example article 100 for the gas turbine engine 20 that includes a composite material bond coat 102 that acts as a barrier layer. The article 100 can be, for example, an airfoil in the compressor section 24 or turbine section 28, a combustor liner panel in the combustor section 26, a blade outer air seal, or other component that would benefit from the examples herein. In this example, the bond coat 102 is used as an environmental barrier layer to protect an underlying substrate 104 from environmental conditions, as well as thermal conditions.

The bond coat 102 includes a matrix 106, a dispersion of "gettering" particles 108, and a dispersion of diffusive particles 110. The matrix 106 may be silicon dioxide ($SiO_2$), in one example. In one example, the gettering particles 108 are silicon oxycarbide particles (SiOC) or silicide particles such as molybdenum disilicide ($MoSi_2$) particles 108, though other examples are contemplated. The gettering particles 108 could be, for instance, molybdenum disilicide particles, tungsten disilicide particles, vanadium disilicide particles, niobium disilicide particles, silicon oxycarbide particles, silicon carbide (SiC) particles, silicon nitride ($Si_3N_4$) particles, silicon oxycarbonitride (SiOCN) particles, silicon aluminum oxynitride (SiAlON) particles, silicon boron oxycarbonitride (SiBOCN) particles, or combinations thereof. The diffusive particles 110 could be, for instance, barium magnesium alumino-silicate (BMAS) particles, barium strontium aluminum silicate particles, magnesium silicate particles, calcium aluminosilicate particles (CAS), alkaline earth aluminum silicate particles, yttrium aluminum silicate particles, ytterbium aluminum silicate particles, other rare earth metal aluminum silicate particles, or combinations thereof.

The bond coat 102 protects the underlying substrate 104 from oxygen and moisture. For example, the substrate 104 can be a ceramic-based substrate, such as a silicon-containing ceramic material. One example is silicon carbide.

Another non-limiting example is silicon nitride. Ceramic matrix composite (CMC) substrates 104 such as silicon carbide fibers in a silicon carbide matrix are also contemplated. These CMC substrates can be formed by melt infiltration, chemical vapor infiltration (CVI), polymer infiltration and pyrolysis (PIP), particulate infiltration, or any other known method.

The gettering particles 108 and the diffusive particles 110 function as an oxygen and moisture diffusion barrier to limit the exposure of the underlying substrate 104 to oxygen and/or moisture from the surrounding environment. Without being bound by any particular theory, the diffusive particles 110, such as BMAS particles 110, enhance oxidation and moisture protection by diffusing to the outer surface of the barrier layer opposite of the substrate 104 and forming a sealing layer that seals the underlying substrate 104 from oxygen/moisture exposure. Additionally, cationic metal species of the diffusive particles 110 (for instance, for BMAS particles, barium, magnesium, and aluminum) can diffuse into the gettering particles 108 to enhance oxidation stability of the gettering material. Further, the diffusion behavior of the diffusive particles 110 may operate to seal any microcracks that could form in the barrier layer. Sealing the micro-cracks could prevent oxygen from infiltrating the barrier layer, which further enhances the oxidation resistance of the barrier layer. The gettering particles 108 can react with oxidant species, such as oxygen or water that could diffuse into the bond coat 102. In this way, the gettering particles 108 could reduce the likelihood of those oxidant species reaching and oxidizing the substrate 104.

During use of the article 100, such as during operation of the engine 20, the bond coat 102 may experience cracks. Cracks in the bond coat 102 may enable oxidants to reach the underlying substrate 104, which leaves the substrate 104 susceptible to environmental attack and degradation. Additionally, the cracks may propagate to the substrate 104, weakening the mechanical integrity of the substrate 104. Accordingly, a self-healing seal coat 114 is disposed directly on the substrate 104 between the substrate 104 and the bond coat 102. The self-healing seal coat 114 protects the substrate 104 in the event of a crack in the bond coat 102 as will be discussed below. This in turn improves the lifetime and reliability of the substrate 104/article 100.

The seal coat 114 includes a seal coat matrix 116 with self-healing particles 118 disposed in the seal coat matrix 116. In one example, the seal coat matrix 116 is silicon carbide. In some examples where the substrate 104 is a CMC, the seal coat matrix 116 is the same material as the matrix of the CMC. For instance, the seal coat 114 may be between about 20 microns to about 200 microns thick.

The self-healing particles 118 are similar to the diffusive particles 110 in that they exhibit diffusion behavior which can seal any microcracks that could form in the bond coat 102 and propagate through the seal coat 114, thereby inhibiting the cracks from propagating to the substrate 104. In general, the self-healing particles 118 exhibit diffusive behavior at lower temperatures than the diffusive particles 110. That is, the self-healing particles 118 and diffusive particles 110 each have a character/composition such that the self-healing particles 118 exhibit diffusive behavior at lower temperatures than the diffusive particles 110.

In particular, the self-healing particles 118 are selected such that the oxidation products of the self-healing particles 118 are viscous oxides that flow/diffuse to seal microcracks. Thus, the self-healing particles 118 also provide a measure of environmental protection to the substrate 104 by consuming oxides, similar to the gettering particles 108 discussed above. For example, the self-healing particles 118 are carbides such as silicon borocarbide or silicon boronitrocarbide, aluminum nitride, borides, silicides, MAX phase particles, refractory metals, or combinations thereof.

In some examples where the substrate 104 is a CMC, the seal coat 114, including seal coat matrix 116 and/or self-healing particles 118, infiltrates into the CMC and/or fills pores at the surface of the CMC that may remain open after formation of the CMC. That is, seal coat 114 materials are present in the CMC and/or in pores on the surface of the CMC. This increases the density of the CMC, which may be desirable in certain circumstances.

In one example, the seal coat 114 includes activator particles 120. The activators hasten and/or improve viscous flow of the self-healing particles 118 upon oxidation and in the event of a crack. The character and amount of activator particles 120 in the seal coat 114 thus regulate the self-healing behavior of the seal coat 114. In a particular example, the seal coat 114 comprises between about 0.1 and about 10 percent by weight activator particles 120. In a further example, the seal coat 114 comprises between about 0.1 and about 5% percent by weight activator particles 120. In a more particular example, the seal coat 114 comprises between about 0.1 and about 2 percent by weight activator particles 120. The particular material of the activator particles 120 is selected from known materials that are operable to hasten and/or improve viscous flow of the self-healing particles 118 upon oxidation. In one example, the self-healing particles 118 are encapsulated with a material that is relatively more inert with respect to oxidants than the material of the self-healing particles 118. For instance, the encapsulating material can be silicon carbide, another carbide, a silicide, and/or a silicate material. In a particular example, the self-healing particles 118 are boron carbide particles encapsulated in silicon carbide. Encapsulated particles as well as methods of encapsulating particles are well-known the in art. The encapsulation slows the oxidation of the self-healing particles 118, and thus slows the diffusive behavior of the self-healing particles 118 when exposed to oxidants in the event of a crack in the bond coat 102. The encapsulation thus provides an additional way to regulate the self-healing behavior of the seal coat 114.

In one example, the seal coat 114 is applied to the substrate 104 by a slurry coating method. Slurry coating methods are well known in the art, and are generally inexpensive and quick. In general, a slurry is prepared with a carrier fluid and constituents of the seal coat 114 (the seal coat matrix 116 material, self-healing particles 118, and optional activator particles 120). The slurry is applied to the substrate 104 by any suitable method depending on the viscosity/solids load of the slurry. The slurry is then cured to form the seal coat 114. Curing conditions are well known, but generally depend on the material selected for the seal coat 114. In some examples, the seal coat 114 is applied in multiple layers which can have the same or different compositions.

As discussed above, in some examples where the substrate 104 is a CMC, the seal coat 114 infiltrates into the CMC. For the slurry coating method, infiltration occurs when the slurry is applied to the substrate 104. The slurry enters into pores on the surface of the CMC substrate 104.

Figure 3:
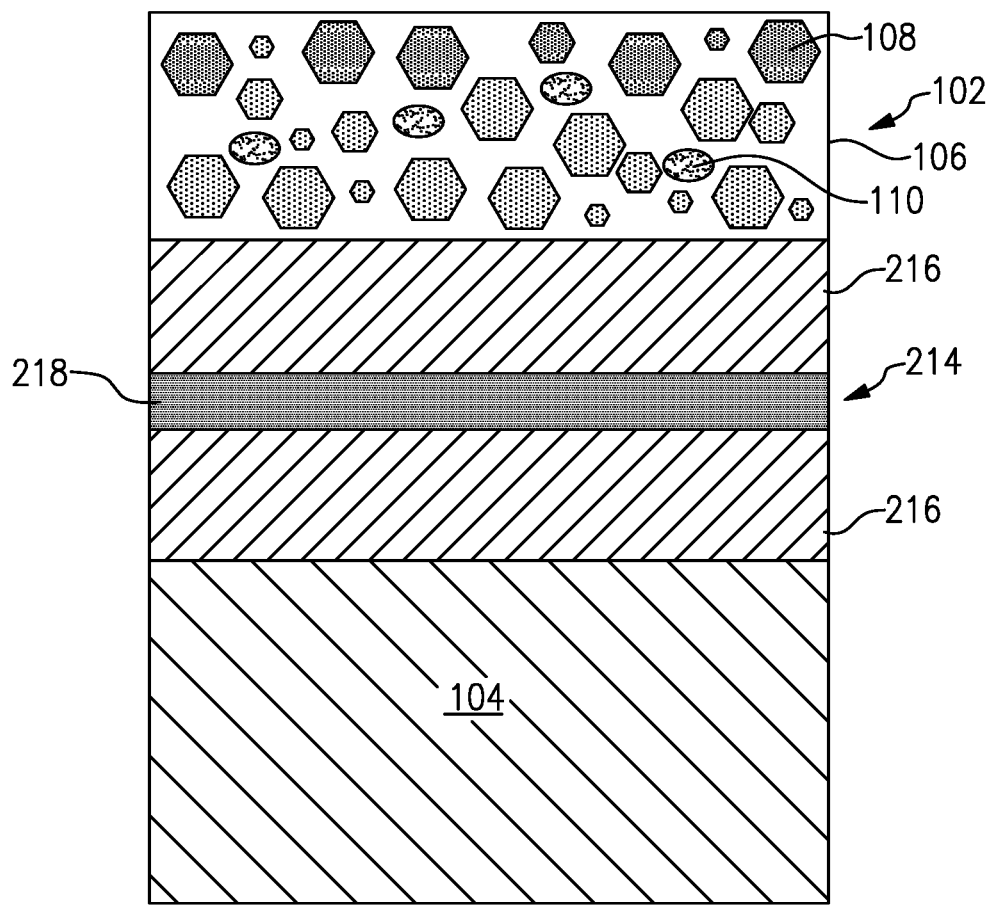
FIG. 3 illustrates another article for the gas turbine engine of FIG. 1 with a coating.

In another example, a seal coat can be applied by CVD (chemical vapor deposition) or CVI (chemical vapor infiltration), which are also well known in the art. In this example, a seal coat 214, shown in FIG. 3, includes one or more layers 216 of seal coat matrix material applied by CVI/CVD directly onto the substrate 104. The layers 216 can have the same or different compositions. For instance, the seal coat matrix 116 can be applied into the residual porosity, especially on the surface of the substrate 104, thereby infiltrating into the substrate 104. One or more layers of self-healing material 218 which comprises the material of self-healing particles 118 discussed above is disposed over the layer(s) 216 of the matrix material. In some examples, the seal coat 214 may include alternating layers 216/218. In general, the outermost layer of the seal coat 214 is a layer 216 of the seal coat matrix material.

Any precursors could be used for the CVD/CVI method that are suitable for applying the seal coat and as are well known in the art. In a particular example, $SiCl_4$ and $BCl_3$ are introduced into a CVI/CVD furnace along with $H_2$ and $N_2$ to deposit silicon boride at temperatures between about 500 and about 1250 C under low pressure conditions.

In this example, the self-healing material 118 also provide a measure of environmental protection to the substrate 104 by consuming oxides, similar to the gettering particles 108 discussed above.

Though a bond coat 102 and seal coat 114 are discussed above, it should be understood that the bond coat 102 and seal coat 114 can be used in conjunction with other coatings that are known in the art.

As used herein, the term "about" has the typical meaning in the art, however in a particular example "about" can mean deviations of up to 10% of the values described herein.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A coating for an article, comprising:
    a seal coat comprising self-healing particles disposed in a seal coat matrix, wherein the seal coat matrix is silicon carbide; and
    a bond coat disposed on the seal coat, the bond coat comprising:
    a matrix;
    diffusive particles disposed in the matrix, and
    gettering particles disposed in the matrix.

2. The coating of claim 1, wherein the seal coat further includes activator particles, the activator particles operable to hasten or improve viscous flow of the self-healing particles upon oxidation.

3. The coating of claim 2, wherein the seal coat comprises between about 0.1 and about 10 percent by weight activator particles.

4. The coating of claim 3, wherein the seal coat comprises between about 0.1 and about 5 percent by weight activator particles.

5. The coating of claim 1, wherein the self-healing particles exhibit diffusive behavior at lower temperatures than the diffusive particles.

6. The coating of claim 1, wherein the self-healing particles comprise at least one of silicon borocarbide, silicon boronitrocarbide, other carbides, aluminum nitride, borides, silicides, MAX phase particles, refractory metals, and combinations thereof.

7. The coating of claim 1, wherein the seal coat is between about 20 microns to about 200 microns thick.

8. The coating of claim 1, wherein the self-healing particles are encapsulated with a material that is relatively more inert with respect to oxidants than the material of the self-healing particles.

9. The coating of claim 1, wherein the coating is operable to be disposed on a ceramic matrix composite substrate.

10. The coating of claim 9, at least some of the seal coat constituents are infiltrated into the ceramic matrix composite.

11. A coating for an article, comprising:
    a bond coat disposed on a surface of the article, the bond coat comprising;
    a matrix:
    diffusive particles disposed in the matrix, and
    gettering particles disposed in the matrix; and
    a seal coat dispose between the surface of the article and the bond coat, the seal coat comprising:
    a first layer of seal coat matrix material disposed on the surface of the article,
    a layer of self-healing material disposed on the first layer of seal coat matrix material, wherein the self-healing material comprises at least one of silicon boronitrocarbide, aluminum nitride, silicides, MAX phase particles, refractory metals, and combinations thereof, and
    a second layer of seal coat matrix material disposed on the layer of self-healing material.

12. The coating of claim 11, wherein the seal coat matrix is silicon carbide.

13. The coating of claim 11, wherein the coating is operable to be disposed on a ceramic matrix composite substrate.

14. The coating of claim 13, wherein at least some of the seal coat constituents are infiltrated into the ceramic matrix composite.

15. A method of applying a coating to an article comprising:
    applying a bond coat over a seal coat disposed on an article, the bond coat comprising, a matrix, diffusive particles disposed in the matrix, and gettering particles disposed in the matrix, and the seal coat comprising a seal coat matrix material and a self-healing material, wherein the seal coat matrix is silicon carbide.

16. The method of claim 15, wherein the seal coat is applied by:
    preparing a slurry comprising a carrier fluid, the seal coat matrix material, and the self-healing material;
    applying the slurry to the article; and
    curing the slurry to form the seal coat.

17. The method of claim 16, wherein the slurry further comprises activator particles, the activator particles operable to hasten or improve viscous flow of the self-healing particles upon oxidation.

18. The coating of claim 1, wherein the self-healing particles comprise at least one of silicon borocarbide, silicon boronitrocarbide, aluminum nitride, borides, silicides, MAX phase particles, refractory metals, and combinations thereof.

* * * * *